United States Patent [19]
D'Hont

[11] Patent Number: 5,491,483
[45] Date of Patent: Feb. 13, 1996

[54] SINGLE LOOP TRANSPONDER SYSTEM AND METHOD

[75] Inventor: Loek J. D'Hont, Almelo, Netherlands

[73] Assignee: Texas Instruments Incorporated, Dallas, Tex.

[21] Appl. No.: 177,510

[22] Filed: Jan. 5, 1994

[51] Int. Cl.⁶ .................................................. G01S 13/00
[52] U.S. Cl. ................................. 342/42; 342/44; 342/50; 342/51; 340/568; 340/572
[58] Field of Search .................................. 342/42, 44, 50, 342/51; 340/568, 572

[56] References Cited

U.S. PATENT DOCUMENTS

| | | | |
|---|---|---|---|
| 3,406,391 | 10/1968 | Le Von, Jr. ................................. | 342/50 |
| 4,074,227 | 2/1978 | Kalmus ..................................... | 342/50 |
| 4,123,754 | 10/1978 | Armstrong ................................. | 342/44 |
| 4,129,855 | 12/1978 | Rodrian ..................................... | 342/44 |
| 4,663,625 | 5/1987 | Yewen ....................................... | 342/44 |
| 4,890,111 | 12/1989 | Nicolet et al. ............................. | 342/51 |
| 4,911,217 | 3/1990 | Dunn et al. ................................ | 342/44 |
| 5,053,774 | 10/1991 | Schuermann et al. ..................... | 342/44 |
| 5,230,393 | 7/1993 | Mezey ...................................... | 177/139 |
| 5,347,263 | 9/1994 | Carroll et al. ............................. | 342/44 |

*Primary Examiner*—J. Woodrow Eldred
*Attorney, Agent, or Firm*—Ira S. Matsil; James C. Kesterson; Richard L. Donaldson

[57] ABSTRACT

An apparatus including an object 10 associated with a contactless, electronic identifier is disclosed herein. In one example, the object 10 is a trash bin. This object 10 is formed from a non-conductive material. A single-loop antenna 14 is disposed adjacent the object 10. An impedance transformer 18 which is matched to the single-loop antenna 14 is used to generate a desired inductance. A transponder 12 is also disposed near to and associated with the object 10. The transponder 12 is coupled to the antenna 14 through the impedance transformer 18.

25 Claims, 2 Drawing Sheets

SINGLE LOOP TRANSPONDER SYSTEM AND METHOD

CROSS-REFERENCE TO RELATED APPLICATIONS

The following co-assigned patent applications are hereby incorporated herein by reference:

| Patent or Ser. No. | Filing Date | Issue Date | TI Case No. |
|---|---|---|---|
| 5,053,774 | 02/13/91 | 10/01/91 | TI-12797A |
| 07/981,635 | 11/25/92 | | TI-16688 |

1. Field of Invention

This invention generally relates to identification systems and specifically to a single loop transponder system and method.

2. Background

There is a great need for devices or apparatuses which make it possible to identify or detect objects in a contactless manner and over a certain distance. An additional desire exists to be able to change the data stored in, or operating characteristics of, such devices or apparatuses (i.e. "program" the devices or apparatuses).

It is, for example, desirable to request contactless and over a certain distance identifications which are uniquely assigned to an object and which are stored in the device or apparatus so that, for example, the object may be identified. A determination may also be made as to whether or not a particular object exists within a given reading range. An example is in the area of waste management where it may be desirable to electronically track the customers from which trash is taken. Another example is the case in which physical parameters such as the weight, temperature or the pressure are to be interrogated directly at or within the object, without direct access to the object being possible. A device or apparatus of the type desired can, for example, be attached to an animal which can then always be identified at an interrogation point without direct contact.

There is also a need for a device which when carried by a person permits access checking whereby only persons whose responder unit returns certain identification data to the interrogation unit are allowed access to a specific area. In this case the safeguarding of the data transfer is a very essential factor in the production of such devices. A further example of a case in which such a device is needed is the computer controlled industrial production in which, without the intervention of operating personnel, components are taken from a store, transported to a production location and there assembled to give a finished product. In this case a device is required which can be attached to the individual components so that the components can be specifically detected in the spares store and taken therefrom.

SUMMARY

In one aspect, the present invention discloses a single loop transponder antenna.

An apparatus including an object associated with a contactless, electronic identifier is disclosed herein. In one example, the object is a trash bin. This object is formed from a non-conductive material. A single-loop antenna is disposed adjacent the object. An impedance transformer which is matched to the single-loop antenna is used to generate the desired inductance. A transponder is also disposed near to and associate with the object. The transponder is coupled to the antenna through the impedance transformer.

An advantage of the invention is that it provides a very large transponder read range. In addition, there are no dead zones in the interrogation area.

The single loop antenna of the present invention is more practical in application (and easier to install) than a multi-turn coil. In fact, it is almost impossible to realize a muliturn coil at 2.6 mH (a typical induction which is required for a transponder). Due to the distributed capacitance buildup in the coil, it would be a real problem to get the Q of the coil high enough for a multiturn coil.

In addition, the transponder arrangement experiences less impact from noise on interrogation because of the relatively strong transponder signal. The strong transponder signal also creates the possibility that the operator will be able to read the transponder from a farther distance. For example, waste disposal personnel would be able to identify their customer and amount of trash without leaving the garbage truck. In addition, there would be no need to extract multiple large, movable interrogation antennas.

Also, the present invention provides advantages which other systems can not offer. The invention provides the capability to readout a waste container in any position over a large read range, without it being handled by anything but the liftarm. Low frequency ID systems cannot perform these tasks. In these systems, one needs to approach the waste-bin close enough, and the transponder location on the bin needs to be known. These limitations require that the bins always be properly positioned. These low frequency systems can benefit by applying the principles disclosed herein to get a larger read range.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

Figure 1:
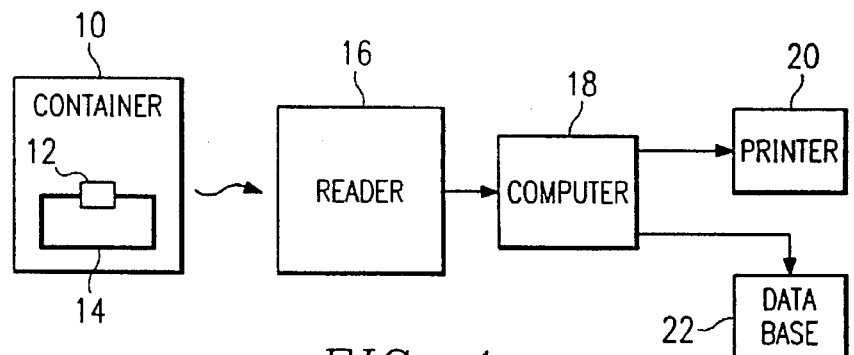
FIG. 1 is a block diagram of a transponder system of the present invention.

The making and use of the presently preferred embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

The following is a description of the apparatus and method of the present invention. An exemplary application will first be described to illustrate the concepts of the present invention. This example will then be expanded to demonstrate the broad use of the inventive concepts.

The present invention will first be described in the context of waste collection. In many instances, a standard price based on the size of the garbage container is charged for waste collection to each household in the community. The same general fee for the same container is paid by an elderly coupled as by a large family with lots of children. However, there is a desire to better manage waste collection and encourage citizens to reduce the waste that they generate. There are at least two different choices to achieve better waste management. The community can select a system that individually weighs and records the amount of waste for each household's container (identify and weight), or a system in which a citizen only puts the container out for pickup when it is full (identification only). For example, collection trucks may visit each neighborhood once a week. The system that weighs containers individually uses transponders as the method to identify each container with a unique number that is associated with a specific customer in the central database. A transponder can be mounted, for example, on the front of the container.

When a container is picked up and placed on the liftam on the back of the truck, the transponder is automatically read by an antenna (e.g., a ferrite stick antenna) that is mounted on the liftarm. The unique ID number stored in the reader can be read by the interrogator. At the same time, the gross weight of the container is recorded. Once the container empties, it is weighed again. The difference between the two weights is calculated and recorded.

All of this data may go to an onboard computer located in the driver's cabin of the truck. A printout is also made as a backup security measure at the time of each collection. After the truck has made its full day's round, it returns to a central location where the driver removes a memory card from the onboard computer and inserts it into the central computer at headquarters. This method of transferring the data from the truck to the central database insures that none of the data can be tampered with. The central computer processes individual customer billings based upon the amount of waste each household produces.

The central computer can be connected to the municipality computer that allows community management to monitor the system. This system achieves the goal of encouraging households to reduce their waste in line with the overall aim of avoiding waste and optimizing the destruction of garbage. It has the added side effects of motivating citizens to sort their waste and deposit such things as glass in the public collection site, and to realize a cost savings on the amount they pay for waste collection/destruction.

In one aspect, the present invention uses a single-loop transponder antenna made from a good conducting material (e.g., copper wire or foil or aluminum wire or foil). This antenna is integrated onto or in the plastic material of the waste bin. A transponder unit is also disposed near the waste bin and is equipped with an impedance transformer. The transformer matches the integrated loop antenna to the desired induction for the transponder chip.

The present invention provides many advantages in the waste disposal area. The need from complex interrogation equipment is eliminated. Using the present invention also eliminates reading holes or dead-zones during transponder interrogation. Further, the present system allows a higher noise-robustness during interrogation. This methodology also allows more application flexibility in actual waste-bin ID situations.

A block diagram of a system which utilizes the present invention is illustrated in FIG. 1. A container 10 is provided and includes a transponder unit 12 and loop antenna 14 mounted thereon. The integration of the transponder 12 and antenna 14 with the container 10 will be described in further detail below.

The transponder unit may comprise any RF (or even microwave) transponder which is capable of communicating with an associated interrogation unit. A preferred embodiment transponder arrangement is described in U.S. Pat. No. 5,053,774, incorporated herein by reference.

In some applications it is desirable to be able to write to the transponder 12 as well as read information from it. A preferred embodiment read/write transponder is described in application Ser. No. 07/981,635, also incorporated herein by reference.

Returning to FIG. 1, information is transmitted from the transponder 12 to an interrogator or reader 16. In the preferred embodiment, the reader 16 transmits an interrogation pulse. The transponder 12 receives this interrogation pulse and, in response, transmits an identification signal. In addition, other information can be transmitted.

The reader 16 may further write information to the transponder 12. This information may include the date and time of waste removal or an identification of which truck performed the removal. Methods for writing to a transponder are described in the co-pending application Ser. No. 07/981,635.

The reader 16 may then store the information in computer 18. The information can then be printed on printer 20 and/or stored in data base 22. In the example described above, the computer 18 could comprise an on-board computer and the data base 22 could comprise a central computer.

Figure 2:
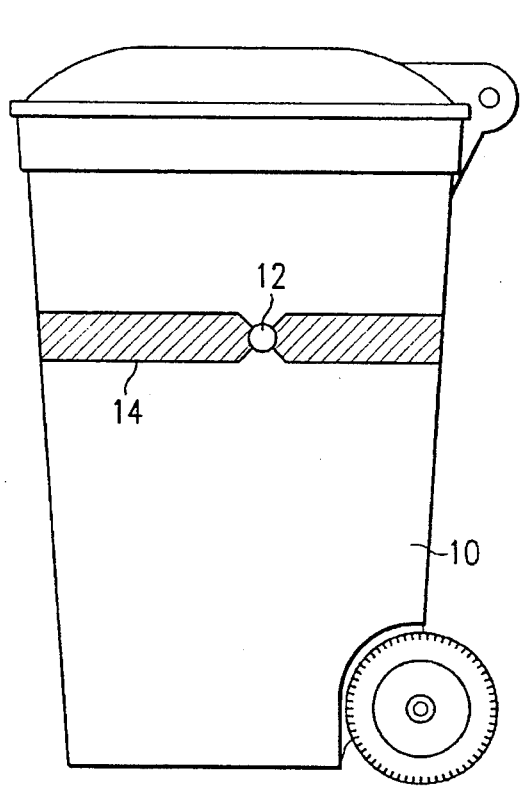
FIG. 2 illustrates a first embodiment transponder and antenna incorporated with a container.

Referring now to FIG. 2, one example of how the antenna 14 and transponder 12 are integrated with the container 10 is illustrated. In this example, the antenna 14 comprises a conductive foil material which is formed on the outside of the container 10. The conductive foil material may comprise aluminum or copper. In the preferred embodiment the foil is about 0.4 mm thick and about one inch wide and reaches around the entire perimeter of the container 10. However, the thickness of the is not very critical.

As a general design guideline, the antenna 14 does not have to be thicker than two times the skin depth at the operating frequency. For example, if a 120 kHz signal is used, the antenna 14 may be 0.4 mm thick. Providing a thicker antenna typically will not help because the skin effect prevents current from flowing in the middle core of the antenna 14. In any event, a thicker antenna should not hurt either. One may, however, wish to use thinner foils (thus violating the skin rule) and compensate for the increased resistance by making the antenna wider.

In general, for the transponder chip 12 (e.g., as described in the U.S. Pat. No. 5,053,774) to function, the ratio $(\omega \times L)/r$ of the loop needs to be larger than 80 for an eight-pluck transponder chip, and between 30 and 60 for a 4-pluck transponder chip. In this ratio, co is the frequency ($\omega = 2\pi f$), L is the loop inductance (a typical value for a waste bin is about 2 μH), and r is the real resistance at the loop operating frequency. This ratio is actually the quality factor (Q) of the loop at a given frequency (i.e., ratio between imaginary resistance and real resistance of the loop). If the impedance of the transformer is ideal, the quality factor will not change after transformation since the ratio $(\omega \times L)/r$ does not change. However, if the transformer is not ideal (which is typically the case), it is recommended to design the loop thickness and antenna width in such a way that the initial Q of the loop (before transformation) is at least 30% higher than needed.

A number of variations of the embodiment illustrated in FIG. 2 are possible. The antenna 14 may be integrated in the actual side wall of the container 10. In other words, the antenna 14 is encapsulated within the plastic (or other material) of the container 10. The foil antenna 14 may be integrated into the container using any number of known techniques. This process is not critical to the present invention. In fact, one also could glue a tape (or bend an aluminum ribbon) around the container 10, or even on inside of the container. The antenna 14 does not need to be integrated within the container material for the invention to be operable.

In addition, a single wire could be substituted for the antenna rather than foil. The wire antenna would typically comprise a good conductor and preferably a metal such as aluminum or copper. For example, about a 2 to 3 mm diameter wire may be used as an antenna. Low-cost conductive wire would be especially attractive if a 4-pluck transponder chip 12 is needed because the Q does not need to be that high.

Another trick when using high resistance loops made from standard wire (thus yielding a low Q) is lowering the coupling factor of the transformer, so that the equivalent network at the transformer terminals shows the (up-transformed) loop inductance in series with the transformer's own impedance (having a high Q). By using the proper low resistance wire on the transformer windings itself, the low-Q of the loop is partially compensated so that the minimum needed system Q can be reached. However, the transponder efficiency (e.g., the read range) is negatively impacted by this method. But since the read range typically has so much overkill already, this method may be suitable in those cases where the loop is just a thin standard wire due to practical installation limitations.

In the preferred embodiment, the antenna 14 comprises a single loop antenna. Alternatively, an antenna 14 with multiple turns can be used. In typical embodiments, however, the single loop antenna is preferred because it is easy to install and can be used in a low cost production environment. Also, in the case of waste bin management for instance, multiple turns do not bring substantially more read range. In fact, the read range may deteriorate because for the best performance the antenna 14 inductance needs to be low compared to the transformer (labeled 18 in FIG. 4) stray inductance. In any event, the present invention is intended to encompass multiple turn antennas as well as single loop antennas.

Figure 3:
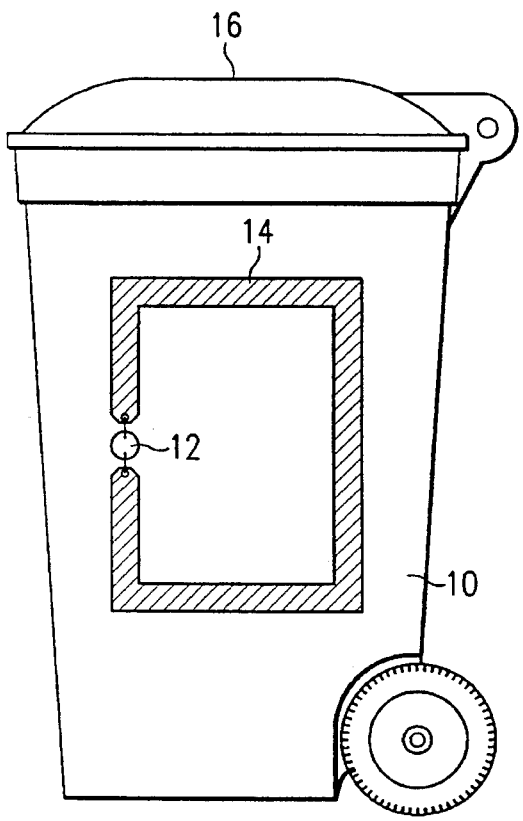
FIG. 3 illustrates an alternate embodiment transponder and antenna incorporated with a container.

An alternate method of integrating the antenna 14 with the container 10 is illustrated in FIG. 3. In this example, the antenna 14 does not encircle the entire perimeter of the container 10 but rather loops on only a portion of the container 10. In the embodiment illustrated in FIG. 3, the loop antenna 14 is created by mounting the antenna 14 on the side of the container 10. The principle of the transponder 12 function is the same, but here the field distribution of the transponder will be perpendicular to the case illustrated in FIG. 2. This type of transponder loop mounting can be desirable in those cases where the interrogation antenna (not shown) would be positioned perpendicular to the mount that one would choose in the FIG. 2 case. Typically, the mount orientation is determined by practical installation factors.

It should also be noted that the antenna 14 may be integrated into the container lid 16. In one embodiment, not illustrated, the antenna 14 may be disposed along the outer perimeter of the lid 16.

Figure 4:
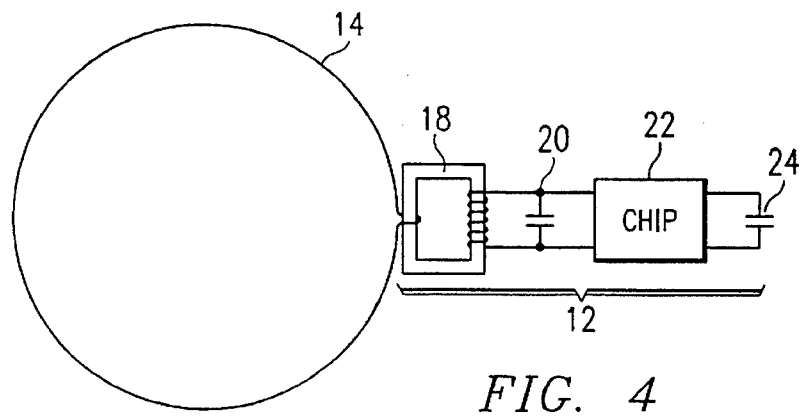
FIG. 4 is a block diagram of an antenna and transponder assembly.

A schematic diagram detailing the coupling between the transponder 12 and antenna 14 is shown in FIG. 4. The antenna 14 is coupled to an impedance transformer 18 which matches the antenna to the desired inductance for the transponder chip 22. A capacitor 20 is provided in parallel with the impedance transformer. The capacitor 20 and impedance transformer 18 together combine to form a resonant circuit. This resonant circuit will oscillate when a signal at the proper frequency is received and will also serve as a carrier wave generator for the transmission of a response signal.

A capacitor 24 is also illustrated in the schematic diagram. This capacitor represents the energy accumulator which will store energy received from an interrogation pulse and then power the internal transponder 22 circuitry to generate a response.

In addition, free mount of large loop transponders is possible in other applications which may require this advantage. As an example, successful tests have been performed with single-loop transponders having antenna loops made from copper tube which is self-supporting and does not require a plastic surface for support. These antennas (as well as those previously described) can be used on applications other than waste bins.

Although the present invention has only been described thus far in terms of waste containers, it can be utilized in a number of other applications. In general, the single-loop VHPT (very high performance transponder) can be used for any application where a transponder loop antenna can be integrated in a large, non-conductive object. In general, the object can be anything formed from a non-metallic, high-conductive material. Examples of materials are rubber, stone, plastic, ceramic, wood and others.

One example of an alternative application is the use of transponders within the railroad industry. In this application, the transponder 12 could be mounted at the side of the track. The train (not illustrated) would have an interrogator so that the location of the train could be monitored at any time. (Of course, in this type of environment much reliability testing would be required because of the potential danger if a train is directed incorrectly or not sensed and an accident results.)

Figure 5:
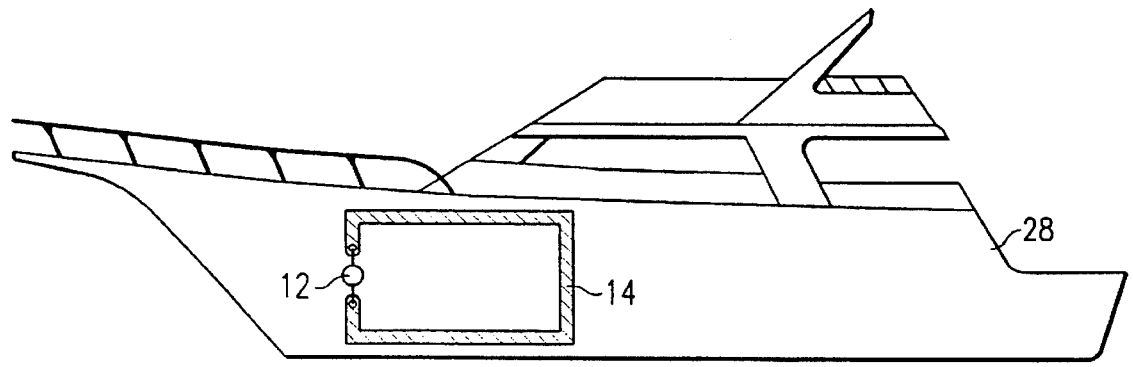
FIG. 5 illustrates an embodiment which incorporates a transponder and antenna with a boat.

In another application which is illustrated in FIG. 5, the loop antenna 14 could be integrated into the side of a boat (e.g., yacht) 28. For example, the boat 28 may be a constructed from polyester or other non-conductive material. A large single strip loop (for example, "large" may be about 2×2 meters) may be integrated in the boat 28. This application may be useful, for example, for law officers who could interrogate yachts while passing them and check if the ship is on a hotlist for stolen yachts. It could also be used to monitor and bill customers who are purchasing gasoline or other supplies without having to do anything more than load the supplies.

Figure 6:
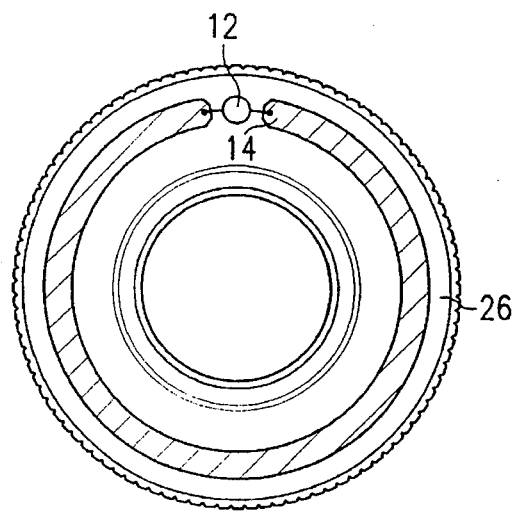
FIG. 6 illustrates an embodiment which incorporates a transponder and antenna with a tire.

Another example of an application of the present invention is related to the integration of a transponder with fires. A tire 26 is illustrated in FIG. 6. Transponder 12 is mounted on or formed within a sidewall of the tire 26. An antenna 14 is also integrated with the tire 26 and is coupled to the transponder 12. In the illustrated example, the antenna extends in a circle along the outer surface of the tire 26. The antenna 14 may also be formed within the rubber material of the sidewall. It should be noted that this application will work as long as there are no steelbelts in the tire (e.g., a canvas tire). This is, of course, unless the steelbelts themselves are used as the antenna 14. Other features involved with integrating transponder units with tires are discussed in co-pending application Ser. No. 08/054,506, incorporated herein by reference.

It should also be noted that steelbelt rings in each edge of the tire 26 can give too much damping, as well as the car rim if the tire is mounted on the rim. Even with these problems, the system should work if the single-loop transponder antenna 14 is placed in the tire 26 as far away as possible from these objects, and a 4-pluck (low-Q) transponder chip 12 is used. In addition, the method previously described where the transponder coupling factor is deliberately brought down can be used. (Of course, practical problems such as sheer forces in the tire and the vulnerability of the ferrite transformer will need to be considered.)

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus comprising:
   an object formed of a non-conductive material;
   a loop antenna disposed adjacent said object;
   an impedance transformer matched to said loop antenna to a desired inductance; and
   a transponder disposed near to and associated with said object, said transponder coupled to said antenna through said impedance transformer.

2. The apparatus of claim 1 wherein said antenna is attached to an external surface of said object.

3. The apparatus of claim 2 wherein said antenna is attached to an outer surface of said object.

4. The apparatus of claim 1 wherein said antenna is formed within said object.

5. The apparatus of claim 1 wherein said antenna comprises a foil antenna.

6. The apparatus of claim 1 wherein said antenna comprises a wire antenna.

7. The apparatus of claim 1 wherein said antenna is formed from an aluminum material.

8. The apparatus of claim 1 wherein said antenna is formed from a copper material.

9. The apparatus of claim 1 wherein said antenna comprises a single loop antenna.

10. An apparatus including an object associated with a contactless, electronic identifier comprising:
    an object formed of a non-conductive material;
    a loop antenna disposed adjacent said object, wherein said antenna is self-supporting and is not attached to said object;
    an impedance transformer matched to said loop antenna to a desired inductance; and
    a transponder disposed near to and associated with said object, said transponder coupled to said antenna through said impedance transformer.

11. The apparatus of claim 1 wherein said object is formed from a plastic material.

12. The apparatus of claim 1 wherein said object comprises a container.

13. The apparatus of claim 12 wherein said object comprises a waste container.

14. The apparatus of claim 1 wherein said object comprises a boat.

15. The apparatus of claim 1 wherein said object comprises a tire.

16. A method of associating an object a with a contactless, electronic identifier comprising the steps of:
    providing an object formed of a non-conductive material;
    disposing a single-loop antenna adjacent said object;
    attaching an impedance transformer to said single-loop antenna, said impedance transformer for transforming the single-loop antenna inductance to a desired inductance;
    coupling a transponder to said antenna through said impedance transformer, said transponder disposed near to and associated with said object.

17. The method of claim 16 and further the steps of:
    transmitting an interrogation signal from a reader to said antenna;
    generating an identification signal within said transponder; and
    transmitting said identification signal from said antenna to said reader.

18. The method of claim 16 wherein said object comprises a container.

19. A method of collecting trash comprising the steps of:
    providing a trash bin formed of a non-conductive material, said trash bin having a transponder unit associated therewith;
    providing a single-loop antenna adjacent said trash bin, said single-loop antenna coupled to said transponder via an impedance transformer;
    transmitting an interrogation signal from a reader to said antenna;
    generating an identification signal within said transponder; and
    transmitting said identification signal from said antenna to said reader.

20. The method of claim 19 and further comprising the steps of:
    weighing said trash bin;
    emptying said trash bin;
    weighing said trash bin; and
    calculating the weight of trash removed from said trash bin during said emptying step.

21. The method of claim 19 wherein said step of forming a single loop antenna comprises the step of forming a single loop antenna on an external surface of said container.

22. The method of claim 19 wherein said step of forming a single loop antenna comprises the step of forming a single loop antenna within said container.

23. The apparatus of claim 5 wherein said foil antenna is about one inch wide.

24. The apparatus of claim 6 wherein wire antenna comprises a wire of about two to three millimeters in diameter.

25. The apparatus of claim 1 wherein said transponder includes an identification stored therein, said identification code for being communicated to a reader device.

* * * * *